US011009337B2

(12) United States Patent
Robledo et al.

(10) Patent No.: US 11,009,337 B2
(45) Date of Patent: May 18, 2021

(54) CALIBRATION OF AN INTERFEROMETER

(71) Applicant: Haag-Streit AG, Koeniz (CH)

(72) Inventors: Lucio Robledo, Bern (CH); Pascal Kesselring, Bern (CH)

(73) Assignee: HAAG-STREIT AG, Koeniz (CH)

( * ) Notice: Subject to any disclaimer, the term of this patent is extended or adjusted under 35 U.S.C. 154(b) by 71 days.

(21) Appl. No.: 16/414,331

(22) Filed: May 16, 2019

(65) Prior Publication Data

US 2019/0271533 A1    Sep. 5, 2019

Related U.S. Application Data

(62) Division of application No. 15/377,615, filed on Dec. 13, 2016, now Pat. No. 10,330,461.

(30) Foreign Application Priority Data

Dec. 14, 2015  (EP) .................................... 15199884

(51) Int. Cl.
*G01B 9/02* (2006.01)
*G01B 21/04* (2006.01)

(52) U.S. Cl.
CPC ..... *G01B 9/02072* (2013.04); *G01B 9/02091* (2013.01); *G01B 21/042* (2013.01)

(58) Field of Classification Search
CPC ............ G01B 9/02072; G01B 9/02091; G01B 21/042
See application file for complete search history.

(56) References Cited

U.S. PATENT DOCUMENTS

| 4,935,635 A | 6/1990 | O'Harra |
| 7,327,469 B2 * | 2/2008 | Deck ................. G01B 11/2441 |
| | | 356/511 |

(Continued)

FOREIGN PATENT DOCUMENTS

| EP | 2 479 546 A1 | 7/2012 |
| EP | 2 633 797 A1 | 9/2013 |
| JP | 2014-190800 A | 10/2014 |

OTHER PUBLICATIONS

Ortiz et al., "Optical coherence tomography for quantitative surface topography", Applied Optics, Optical Society of America, Washington DC, Dec. 10, 2009, vol. 48, No. 35, pp. 6708-6715.

(Continued)

*Primary Examiner* — Michael A Lyons
(74) *Attorney, Agent, or Firm* — Birch, Stewart, Kolasch & Birch, LLP

(57) ABSTRACT

In a method for calibrating an interferometer (100) having a beam path for a measuring beam (112), wherein at least one plane (320) that at least partially reflects the measuring beam (112) has been introduced into the beam path, and wherein a normal to a first plane (320) is inclined at a first angle to a measuring beam (112) incident on the first plane (320), the following steps are carried out: interferometric measurement of a first axial spacing of a first point on the first plane (320) with the measuring beam (112), and interferometric measurement of a second axial spacing of a second point on one of the at least one plane (320) with the measuring beam (112), wherein the second point is spaced apart from the first point.

14 Claims, 2 Drawing Sheets

(56) References Cited

U.S. PATENT DOCUMENTS

| | | | |
|---|---|---|---|
| 7,436,520 B1 * | 10/2008 | Doerband | G01B 11/2441 |
| | | | 356/512 |
| 8,269,981 B1 | 9/2012 | Doerband et al. | |
| 8,294,902 B2 | 10/2012 | Oota | |
| 10,330,461 B2 * | 6/2019 | Robledo | G01B 9/02072 |
| 2002/0080366 A1 | 6/2002 | Nakayama | |
| 2003/0090798 A1 | 5/2003 | Evans et al. | |
| 2007/0247639 A1 | 10/2007 | Amstel et al. | |

OTHER PUBLICATIONS

Zhao et al., "3D refraction correction and extraction of clinical parameters from spectral domain optical coherence tomography of the cornea", Optics Express, Apr. 26, 2010, vol. 18, No. 9, pp. 8923-8936.

\* cited by examiner

CALIBRATION OF AN INTERFEROMETER

CROSS REFERENCE TO RELATED APPLICATIONS

This application is a Divisional of copending application Ser. No. 15/377,615, filed on Dec. 13, 2016, which claims priority under 35 U.S.C. § 119(a) to application Ser. No. 15/199,884.6, filed in the European Patent Office on Dec. 14, 2015, all of which are hereby expressly incorporated by reference into the present application.

TECHNICAL FIELD

The invention relates to a method for calibrating an interferometer having a beam path for a measuring beam, wherein at least one plane that at least partially reflects the measuring beam has been introduced into the beam path. Furthermore, the invention relates to a test specimen for calibrating an interferometer and to an interferometer having a test specimen.

PRIOR ART

In interferometry, measurements are carried out by way of superpositions of waves. To this end, different types of interferometer are known. Typical representatives are the Mach-Zehnder interferometer and the Michelson interferometer.

Using OCT scanners, it is also possible to measure scattering materials at depth. This is achieved by the use of light with a short coherence length. In 3D OCT measurement, a one-dimensional axial measurement is combined with a two-dimensional lateral deflection, whereby precise spatial assignments of the measurement data can be carried out. The measuring systems have to exhibit high absolute accuracy in order to be able to ensure good measurement results. This relates for example to the lateral position of the measuring beam, or the exact lateral displacement of the measuring beam by the deflection device. In addition to the constructive means, the high precision is also achieved by suitable calibration methods.

Various techniques are known for calibrating an interferometer. Typically, measurement objects are used for this purpose, the geometries of which are assumed to be known. If the measurement object is now measured with the interferometer, the interferometer can be adjusted on the basis of the difference between the measurement data and the known data of the measurement object.

The publication by Mingtao Zhao et al. with the title "3D refraction correction and extraction of clinical parameters from spectral domain optical coherence tomography of the cornea" (26 Apr. 2010/Vol. 18, No. 9/Optics Express) shows calibration of an OCT scanner, wherein a plane is measured with 25 µm targets. On the basis of the measured axial spacings of the targets and the known elevations or depressions of the targets, the calibration of the OCT scanner can be carried out.

Furthermore, the Sergio Ortiz et al. with the title "Optical coherence tomography for quantitative surface topography" (10 Dec. 2009, Applied Optics/Vol. 48, No. 35) shows calibration of an OCT scanner by means of an optical grating. For the calibration, use is made of a flat plate with a diffuse surface which exhibits a black grating on a white background.

A disadvantage with the known systems is that the interferometers cannot be calibrated sufficiently accurately. Furthermore, certain sources of error which can arise in an interferometer are not taken into account. In particular, only individual reference points are exactly measured as a rule, interpolation merely being carried out in between.

SUMMARY OF THE INVENTION

The object of the invention is to create a method, belonging to the technical field mentioned at the beginning, for calibrating an interferometer, said method allowing precise calibration while taking a plurality of sources of error into consideration. A further object of the invention is to provide a corresponding test specimen and an interferometer comprising the test specimen.

According to the invention, a normal to a first plane is inclined at a first angle to a measuring beam incident on the first plane, and the following steps are carried out:
a. interferometric measurement of a first axial spacing of a first point on the first plane with the measuring beam;
b. interferometric measurement of a second axial spacing of a second point on one of the at least one plane with the measuring beam, wherein the second point is spaced apart from the first point.

An interferometer having a beam path, in particular an OCT scanner, comprises a test specimen for calibrating the interferometer, wherein the test specimen is arranged in the beam path and has at least one first plane for at least partially reflecting a measuring beam of the interferometer. A normal to the first plane is in this case inclined at a first angle to a beam path incident on the plane.

The term calibration is understood to mean the determining of data which allow a conclusion to be drawn about the absolute accuracy, in particular the actual lateral position and optionally the direction of the measuring beam of the interferometer to be calibrated. Using these data, not only is it possible for the interferometer to be mechanically calibrated, but future measurement data can also be corrected or cleansed with the aid of these data.

The interferometer preferably comprises a light source, a sample arm, a reference arm and a detector, and also a deflection unit for deflecting the measuring beam in a plane at right angles to the measuring beam direction.

The term OCT is understood to mean an optical coherence tomograph. In this case, light is used to measure the distance of scattering materials with the aid of an interferometer. Such devices are known to a person skilled in the art.

With the measuring beam of the OCT, an object to be examined, for example an eye, a test specimen for calibrating the OCT or the like is measured. The measuring beam scans the surface of the object, whereby a depth profile is obtained. Typically, to this end, the measuring beam is moved laterally in the xy plane in order to scan the object in a point-by-point manner. The distances from the object are measured in the z direction.

The term plane is understood in the following text in the topographical meaning, i.e. a plane has at least a two-dimensional, planar surface. In principle, for the present invention, a two-dimensional limit plane between two media with different optical densities or refractive indices is already considered to be a plane. The plane serves to reflect at least a part of the measuring beam such that a spacing with respect to this plane can be measured with the interferometer. Preferably, however, the plane or planes are flat or plate-like reflectors having a small thickness compared with the reflection surface.

The plane is configured so as to at least partially reflect the measuring beam, wherein the residual radiation of the measuring beam can be absorbable or transmissible by the plane.

The term normal is understood in the geometric sense as a straight line which is perpendicular or at right angles to the plane.

The measuring beam is incident on the first plane in an inclined manner with respect to the normal to the first plane and is at least partially reflected thereby. In other words, the measuring beam is not incident on the plane with its direction of incidence at right angles, since said plane has been inclined about an axis outside the z-axis. Preferably, the plane is inclined or inclinable about an x-axis or about a y-axis. The plane can also be inclinable about both axes, both the x-axis and the y-axis. Furthermore, it is also possible for a plurality of planes to be provided, of which one is inclined about the x-axis and the other about the y-axis. On the other hand, it is not absolutely necessary for both axes to be at right angles to one another.

The plane, the first angle and the measuring beam are configured and arranged such that at least a part of the measuring beam reflected by the first plane is reflected or scattered in the direction of incidence, such that a spacing can be determined interferometrically. The first angle for calculating the calibration is preferably presumed to be known—on the other hand, it is possible, with a calibrated interferometer, to also calibrate or determine the angle of the plane.

The term axial spacing is understood to mean a spacing or a distance in the direction of the measuring beam. Unless stated otherwise, the spacing denotes a distance between a point of emergence from the optics of the interferometer and a point on the plane. The region of emergence of the optics is assumed to be a plane at right angles to the measuring beam emergence direction. Likewise, the axial direction is understood to be the measuring beam direction or the z direction. It is clear to a person skilled in the art that the measuring beam direction can be dependent on a lateral point of emergence from an optics, i.e. if the measuring beam emerges from the optics for example in a peripheral region of a lens, the measuring beam can deviate from an ideal direction which is adopted for example in the center of the lens. Unless stated otherwise, it is assumed in the following text that laterally spaced-apart measuring beams are parallel when incident on a plane and thus represent the ideal case.

In the method, first of all a first axial spacing of a first point on the first plane is measured interferometrically with the measuring beam. Subsequently, a second axial spacing of a second point on one of the at least one plane is measured with the measuring beam. The first and the second point are spaced apart from one another. The two points can in this case be spaced apart both axially and laterally. Furthermore, a combination of an axial and lateral spacing is also possible. The one of the at least one plane can be either the first plane or a second or further plane. One or more of the planes can be configured in an inclinable manner.

Since the first plane is inclined at a first angle, spacings of two points spaced apart on the first plane can be measured, and so it is possible to extrapolate a lateral spacing between the measuring beams on account of the known first angle. Thus, the lateral displacement of the measuring beam can be calibrated. Since the first plane is inclined at an angle, this calibration can be carried out starting from different lateral positions (for example near the center, or in the peripheral region of the optics). Likewise, calibrations can be carried out with different axial spacing differences (in the z direction) in that simply the lateral spacing between the points is varied. A further advantage is that not just individual points can be compared, but trajectories defined by sequences of points (see below).

In a preferred embodiment, the first angle is less than 50 mrad, preferably less than 20 mrad, particularly preferably less than 5 mrad, wherein 1 mrad=0.001 rad=0.001×180°/pi. The range from 1-5 mrad has been found to be particularly advantageous in numerous studies. In this case, sufficient axial reflection at the inclined plane or the detection efficiency should be weighed against the difference in the axial distance from the plane in the case of two laterally spaced-apart measurement points. The smaller the selected angle between the normal to the plane and a beam path incident on the plane, the greater the proportion of the measuring beam reflected in the direction of the beam path, and so better measurement results can be achieved. The greater the selected angle, the greater, by contrast, the change in axial distance in the case of a lateral displacement of the measuring arm, whereby more precise calibration can be achieved.

However, depending on the dimensions of the interferometer, in particular of a measurement region in the xy plane, on the surface quality of the planes and on the requirements for the precision of the calibration, other angles can also be provided, which can in particular also be greater than 50 mrad.

In a preferred embodiment, the first plane can be inclinable in a motor-driven manner. Furthermore, a further plane or a plurality of planes can also be inclinable in a motor-driven manner, however. One or more planes can also be movable into or out of the beam path, or vice versa, in a motor-driven manner. Thus, depending on the application, different angles with optionally different planes can be set, whereby the calibration method can be kept variable overall. The mechanical realization of the motor-driven adjustment of angles is well-known to a person skilled in the art, and suitable techniques are used for example in tilting mirrors in optical apparatuses. The motor drive can in this case interact directly with a pivot pin in order to rotate the latter directly or via a transmission. Furthermore, a linear drive can also be provided, via which the plane is inclined about the pivot pin by means of a lever arm.

The first plane can also be configured to be inclinable in some other way. Thus, the inclination operation can also take place manually. Furthermore, electromagnets can also be used to incline the first plane. Thus, very short switching times can be achieved in particular in the case of two inclined positions.

It is also possible for more than one plane to be configured in an inclinable manner. In particular, it is also possible for example for two or more planes to be arranged fixedly, in particular in a V-shaped manner, with respect to one another, wherein the two or more planes are inclined together.

In another preferred embodiment, none of the planes are actuable in a motor-driven manner, but rather are arranged fixedly with regard to a test specimen or the interferometer (see below).

Preferably, an interferometer has to this end, in addition to the first plane, a second plane for reflecting the measuring beam, said second plane being inclined with respect to the first plane.

In variants, the planes can also be comprised by a separate test specimen which is not part of the interferometer. In a further variant, the interferometer can also comprise such a test specimen, however.

Preferably, the first plane has a planarity which is below the measurement accuracy of the interferometer. As a result, good precision of the calibration method is achieved. On the other hand, it may be advantageous for the plane to have a scattering effect which, in spite of the inclination of the plane with respect to the measuring beam, can reflect a sufficiently large proportion of the measuring beam back exactly in the measuring beam direction. In this way, the signal intensity can be optimized.

In variants, the planarity can also be above the measurement accuracy of the interferometer, in favor of the scattering of the measuring beam and thus of the signal strength. This does not ultimately depend on the measurement accuracy of the interferometer.

Preferably, a measuring lens is positioned from a first position, for measuring an object in the measuring position, to a second position for calibrating the interferometer, such that the measuring lens is directed at the first plane. In this variant, the plane is preferably arranged fixedly in the interferometer. As a result of the fixed position, the plane can be positioned particularly precisely, and in particular, the angle of the plane to the beam path can thus be defined with a high level of precision. As a result of the precise angle, optimum calibration of the interferometer can in turn be achieved.

In a further variant, the first plane is introduced into the beam path in a measuring position of the interferometer. To this end, the plane, for example in the form of a test specimen (see below), can be inclinable into the beam path of the interferometer, in particular into the measuring position of the interferometer.

The measuring position in this case denotes that position in which an object that is to be examined by means of the interferometer is placed, i.e. typically at the end of the measuring arm. As a result of this arrangement, the entire interferometer can easily be calibrated in one step. All sources of error can thus be sensed in a cumulative manner and remedied in one step, whereby particularly precise and efficient calibration is achieved. This method is of particular significance when the sources of error are intended to be managed by suitable algorithms.

In further variants, the first plane can also, alternatively or additionally, be arranged in other regions of the interferometer. This can be advantageous when a source of error is intended to be located such that it can be remedied mechanically, for example by changing or replacing optical components.

Preferably, in order to measure the second spacing, the measuring beam is displaced laterally by a first distance on one of the planes such that the second point is spaced apart from the first point. It is clear to a person skilled in the art that the lateral displacement takes place by means of an optics and the end result of the lateral displacement on the plane occurs depending on the displacement device, for example depending on a tilting mirror. The effective lateral displacement of the measuring beam on the plane is, as explained above, ultimately determined by way of the known inclination angle of the first plane and the measured difference in the axial spacings of the points, in order to calibrate the interferometer.

In variants or additionally, it is also possible for the first plane to be moved or for the measuring beam to be reflected at a second plane spaced apart from the first plane.

Preferably, the measuring beam is guided to an optics by means of a tilting mirror, wherein, as a result of the tilting mirror being inclined, the measuring beam emerging from the optics is laterally displaced by the first distance on one of the planes. The tilting mirror can to this end deflect the measuring beam to a converging lens which guides the beam to one of the planes in each case in a manner parallel to a measuring beam direction. Such a deflection unit can be configured for example on the basis of a galvanometric scanner or as a MEMS mirror.

In variants, a linearly displaceable reflector, for example a mirror or a prism, can also be provided to laterally displace the measuring beam. Further embodiments are known to a person skilled in the art.

Preferably, by means of the first angle and a difference between the spacings of the first point and the second point, the lateral spacing between the first point and the second point is calculated. The lateral spacing (in the x direction in the present case) is calculated as follows:

$$\Delta x = \Delta z \cdot \tan \alpha$$

Here, $\Delta z = z_2 - z_1$ denotes a difference in spacing between the measured spacing of the first point and the measured spacing of the second point in the z direction, or in the axial direction. The known inclination angle of the plane is denoted by $\alpha$—the inclination axis is parallel to the y-axis in the present case, and the angle itself is in the xz plane. The inclination angle $\alpha$ is thus determined between the normal to the first plane and the z direction, or the axial direction. The tangent function is, as usual, abbreviated tan. Finally, $\Delta x$ denotes the lateral spacing between the two points. This lateral spacing is ideally also the spacing between the laterally spaced-apart measuring beams in order to measure the spacings of the two points.

Preferably, with the data from the calibration (and also from calibration data described below), the measurement results are cleansed such that more precise measurements can be carried out. Thus, particularly efficient calibration is achieved. In variants, the data can also be used in order to mechanically adjust the device or to optimize the control of beam deflection.

It is clear to a person skilled in the art that $\Delta y$ can be determined analogously when the lateral displacement takes place in the y direction and the plane has been inclined about an inclination axis parallel to the x-axis. In a particularly preferred method, both lateral spacings are calibrated, both in the x direction and in the y direction.

In variants, the angle of the plane or the axial difference between the points can also be calibrated as long as the two other values ($\Delta x$ and $\Delta z$ or $\Delta x$ and $\alpha$) are known.

A known source of error in interferometers, in particular also in OCT apparatuses, is what is known as image field curvature. This arises in that, upon lateral displacement of the measuring beam, the points with constant optical path length differences are not on a straight line, as in an ideal case, but extend along a non-straight curve, this being referred to as an offset dependent on the lateral position. When a planar object is measured, this can appear curved, for example. Furthermore, two laterally spaced-apart measuring beams which are incident on the plane cannot extend parallel on account of sources of error in the optics, such that two laterally spaced-apart measuring beams, rather than extending parallel, enclose an angle $\beta > 0$. Such sources of error can also be eliminated.

In a further preferred method, in order to eliminate image field curvatures, the spacings of the first and of the second point on the first plane inclined at the first angle are preferably measured. A spacing of a third and a spacing of a fourth point are measured on one of the planes, which is or has been tilted at a negative value of the first angle. Here, all of the points are spaced apart from one another in pairs.

In a preferred method, the first and the third point and the second and the fourth point, respectively, are located on a common measurement axis. Ideally, the two measurement axes are located in the z direction. In the case of an image field curvature, one of these measurement axes can deviate from the ideal z direction.

In this preferred method, as described above, the lateral spacings of the two measurement points are calculated. Ideally, that is to say without image field curvature, the two lateral spacings would turn out identical. On account of the difference in the two lateral spacings, the degree of image field curvature can now be extrapolated in order to eliminate it.

In variants, rather than the negative value of the first angle, some other angle can also be selected.

Preferably, the first plane is inclined, in particular fixedly inclined, at the first angle about a first axis, wherein a second plane for measuring the distances of the third and of the fourth point is inclined, in particular fixedly inclined, at a second angle about a second axis that is not parallel to the first axis. The first axis and the second axis are thus either skew or have a point of intersection. Thus, calibration in both the x direction and in the y direction can be achieved with the first and the second plane.

In variants, it is also possible to provide exactly one plane which is inclinable about two non-parallel axes.

Preferably, the first point and the second point are each points of a single, common trajectory, wherein in particular a plurality of points of the trajectory are measured in each case, and wherein the trajectory has in particular a minimum radius of curvature which amounts to at least 1/7 of a radius of a circumference of a surface to be measured. The trajectory in this case relates to a continuous movement of the measuring beam along the plane. During the continuous movement of the measuring beam along the plane, measurements can be carried out in each case at particular intervals, said measurements preferably, but not necessarily, being carried out at a constant frequency.

Particularly preferably, the calibration takes place along a trajectory which is subsequently also intended to be carried out for examinations of the object, for example of an eye. Thus, calibration of the interferometer can be carried out selectively for the measurements to be carried out. In particular, measurement errors which are located outside the trajectory can thus be ignored, and so no unnecessary calibration effort has to be made. In this way, the calibration method can be kept efficient overall. On the other hand, however, it is also possible to select a trajectory which allows particularly optimal calibration of the entire measurement area, such that optimal calibration is achievable regardless of the trajectory provided for a measurement.

In variants, rather than along a trajectory, it is also possible to calibrate in a point-by-point manner, in a grid, for example only grating nodes.

Preferably, on account of the measured points, measuring beam guidance is controlled such that a deviation between the measured points and an ideal trajectory is minimized. In this case, in the method, a calibration is carried out in a first step, whereupon, in a subsequent measurement, the data are employed for correcting the measurement, in particular for optimizing the control of the deflection unit. Thus, particularly simple and cost-effective calibration is achieved since no mechanical interventions in the system have to be carried out. Furthermore, it is thus possible to automate the calibration such that a user can carry it out independently.

In variants, on the basis of the calibration data, mechanical adjustment of the device can also be carried out. Furthermore, the calibration method can be designed such that, with certain deviations, for example with particularly large deviations, such an adjustment of the device is carried out and, for marginal deviations, in particular in the same calibration method, a purely arithmetic correction of future measurement data is carried out.

In order to carry out the method, use can be made of a test specimen which is able to be placed in a beam path axis for a measuring beam of the interferometer.

Such a test specimen for calibrating an interferometer, in particular an OCT scanner, is introduced into a beam path of the interferometer. The test specimen comprises a beam path axis for a measuring beam of the interferometer and successively comprises at least one first plane and a second plane, with which a measuring beam of the interferometer is at least partially reflectable, and wherein the first plane is partially transmissible to the measuring beam on both sides, and wherein a normal to at least one of the planes is inclined at a first angle to the beam path axis. The test specimen thus comprises two possible reflectors for the measuring beam, which are reachable via the same beam path axis. Thus, a testable and optionally certifiable component is achieved with which the interferometer can be calibrated.

Preferably, the test specimen is configured to be introduced into the beam path of the interferometer in a measuring position. Thus, a single test specimen can be used for several interferometers, thereby making it possible to achieve cost-effective calibration for a plurality of interferometers. Furthermore, the test specimen can thus easily be exchanged, for example in order to carry out calibration with a different test specimen having for example a different first angle, or in order to be able to calibrate the test specimen itself.

In variants, the test specimen can also be installed fixedly in the interferometer such that a beam path is deflected onto the test specimen in order to carry out the calibration. Furthermore, the test specimen can also be connected fixedly to the interferometer such that it can be moved or pivoted into the beam path, and vice versa.

Preferably, the test specimen also comprises a third and a fourth plane that partially reflect the measuring beam, wherein the second and the third plane are partially transmissible to the measuring beam on both sides and wherein the first, the second, the third and the fourth plane are located in succession on the beam path axis. The fourth plane does not necessarily have to be transmissible when the measuring beam is not intended to reach a further plane located behind the fourth plane. The configuration of a plurality of planes, in particular also differently inclined planes, allows diversified calibration of the interferometer at different axial and lateral spacings between the measurement points. In particular, simultaneous determination of the lateral coordinates, the beam direction and the image field curvature is thus allowed, thereby providing a particularly efficient calibration method.

In variants, a different number of planes can also be provided in the test specimen. For example, three, five or more than five planes can also be provided. Furthermore, the test specimen can also be configured in a rotatable or axially movable manner.

Preferably, a first normal to the first plane and a second normal to the second plane, and a third normal to the third plane and a fourth normal to the fourth plane, intersect. As a result, a variation in the planes is achieved such that different calibration methods can be executed. The planes can, however, also differ in surface quality, refractive index, plane thickness, etc., in order that further factors can be taken into consideration in the calibration.

In variants, it is also possible for example to arrange three or more planes in parallel.

Preferably, the first and the second plane are inclined about a first axis and the third and the fourth plane are inclined about a second axis, wherein the first and the second axis are different, in particular spaced apart and non-parallel. Thus, two planes are achieved which are inclined in different spatial directions, such that calibration can be easily achieved both in the x direction and in the y direction. Particularly preferably, the two axes are oriented in the x direction and in the y direction, respectively. Further planes can also be inclined about further axes which differ from the first and the second.

In variants, the first and the second axis can also be parallel and differ for example in inclination angle.

Preferably, the at least one plane is configured as a glass plate or as a mirror and in a partially transmissive manner for the measuring beam. In this way, a particularly cost-effective embodiment of the test specimen is achieved. If several planes are arranged in succession, those planes are partially transmissive which are located upstream of a further plane in the beam path direction such that the further plane can be struck by the measuring beam. The transmissivity of the plane relates in this case to the measuring beam. If the interferometer is intended for measuring beams in different spectra, it may suffice for the partial transmissivity to be present for a particular subspectrum, but preferably, the planes are partially transmissive for the entire spectrum of the measuring beam.

In variants, it is also possible to use partially transmissive materials, for example a plastics material. Materials that are suitable for this purpose are known to a person skilled in the art.

In summary, the following variants are allowed for calibration:

1. In order to determine the lateral exact beam position and the beam angle for each control signal of the deflection unit, the following procedure can be followed:
    a. A plane, for example a flat object such as a glass plate or a mirror is brought into the beam path. The plane is or has been tilted about an axis perpendicular to the beam direction. The angle between the surface normal and the beam direction is in this case assumed to be known.
    b. A distance from a point on the plane is measured interferometrically.
    c. A control signal is applied to the deflection unit such that the measuring beam is displaced laterally (in parallel).
    d. A distance from a further point, displaced laterally with respect to the first point, on the plane is measured interferometrically.
    e. On the basis of the known angle and the two measured distances, the lateral position in the tilting direction can be calculated.
    In order to be able to relate different lateral positions to one another, a distance from the tilted plane has to be known or at least constant.
2. The calibration can be carried out for trajectories. The control signal in this case consists of a sequence of values. For each value, a distance from the tilted object is measured. The component of the trajectory in the tilting direction can now be calculated from the distances.
3. The calibration can also be carried out for two-dimensional trajectories. The control signal in this case consists of a sequence of tuples (for example of the two signals for the x-axis and y-axis). The object is first of all tilted in a direction (for example along the x-axis) and the distance is measured for each element of the sequence. From these distances, the component of the trajectory in the first tilting direction can be measured. Subsequently, the object is tilted in a second direction (for example along the y-axis), and the distance is measured for each element of the sequence. From these second distances, the component of the trajectory in the second tilting direction can be measured.
4. Furthermore, an image field curvature can be eliminated. Depending on the measurement optics used (lens, scanner geometry), the measured distance can contain an offset dependent on the lateral position. If the distance from a planar object is measured for different lateral positions, said object appears curved in this case. In order nevertheless to obtain correct calibration, in a first measurement, the object can be tilted at a positive angle with respect to the beam direction and the distance can be measured. In a second step, the object is tilted at the same angle but in the opposite direction with respect to the beam direction. The distance is measured again. The lateral position can in turn be calculated from the difference of the two distances and the difference of the two tilting angles, and so it is possible to extrapolate the degree of image field curvature.
5. The calibration can be carried out with a multisided calibration body with statically tilted planes. To this end, an object is used which contains a plurality of planes that are tilted with respect to one another, for example an arrangement consisting of four glass faces, the normals to which are tilted in the +x, −x, +y, −y direction with respect to a measuring beam direction. The advantage of such an arrangement is that the tilting angles can be determined precisely by construction or by mechanical measurement, and that several calibration measurements can be combined into one measurement.
6. Furthermore, a beam angle can be determined. To this end, the calibration of the trajectories is carried out at two different axial distances from the lens. In this way, the angle of the beam can be determined from the difference of the lateral positions and the difference of the axial distances.
7. The trajectories can be optimized. The calibration method described is appropriate in particular in open-loop control of the deflection unit. In order to approximate the trajectory executed by the deflection unit to an ideal trajectory even in open-loop control, it is possible, optionally iteratively, to adapt the control signals such that the difference between the executed trajectory and the ideal trajectory is minimized. The calibration method can, however, also be implemented in closed-loop control.
8. The calibration body can be integrated into the OCT apparatus. This allows the correct operation of the apparatus to be checked, or allows recalibration (periodically, or when the operating conditions are changed). Furthermore, in this way, new trajectories can be made available for the apparatus and can be used for quantitative (calibrated) measurements, without it being necessary to carry out complicated user interventions.

Further advantageous embodiments and combinations of features of the invention can be gathered from the following detailed description and the entirety of the claims.

BRIEF DESCRIPTION OF THE DRAWINGS

In the drawings used to explain the exemplary embodiment.

In principle, identical parts are provided with identical reference signs in the figures.

WAYS OF IMPLEMENTING THE INVENTION

Figure 1:
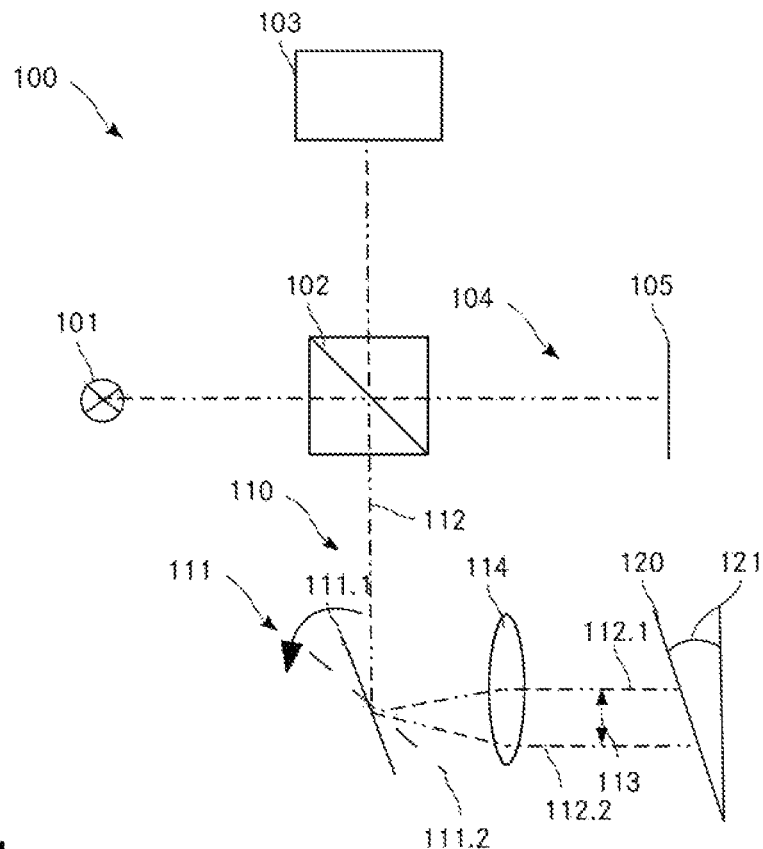
FIG. 1 shows a schematic structure of an interferometer with a tilted plane in the measuring position, for carrying out the calibration method.

FIG. 1 shows a schematic structure of an interferometer 100 with a tilted plane 120 in the measuring position, for carrying out the calibration method. The interferometer 100 represents merely an exemplary embodiment and can also be configured in some other way.

The interferometer 100 is configured in the present case as a Michelson interferometer. The interferometer 100 comprises a light source 101 such that the interferometer 100 is able to be used for optical coherence tomography. The light of the light source 101 is split via a beam splitter 102 to a reference arm 104 having a reflector 105 and to a measuring arm 110, in the present case as a measuring beam 112. Light reflected from the reference arm 104 or measuring arm 110 is guided to the detector 103, which in the present case converts the optical signal into an electrical signal by means of a photodiode.

In the measuring arm 110, the measuring beam 112 is incident on a tilting mirror 111 which is illustrated in a first position 111.1 by way of a solid line and in a second position 111.2 by way of a dashed line in FIG. 1. The tilting mirror 111 is thus inclinable, in the present case in a motor-driven manner, from a first position 111.1 into a second position 111.2 and back again. The same tilting mirror 111 or a further tilting mirror (not illustrated) is inclinable in a further axis such that the measuring beam can move two-dimensionally in an xy plane. Such interferometers 100 and modifications thereof are well known to a person skilled in the art.

The measuring beam 112.1 reflected by the tilting mirror 111 in the first position 111.1 is incident on an optics 114 which guides the measuring beam 112.1 onto a tilted reflection plane 120. In the present case, the optics 114 is illustrated for example as a single lens—however, it is clear to a person skilled in the art that the optics 114 can comprise several optical elements, in particular several lenses. The reflection plane 120 or simply plane 120 is configured as a thin glass plate in the present case. The reflection plane 120 is arranged in the measuring position of the interferometer 100, that is to say where an object to be measured, for example an eye, would otherwise be placed. However, it is clear to a person skilled in the art that the reflection plane 120 does not necessarily have to be arranged in the measuring position but can also be arranged within the optics 114 or between the tilting mirror 111 and optics 114. A normal to the reflection plane 120 is pivoted at an angle of 5 mrad with respect to the measuring beam emerging from the optics 114, wherein the angle is not reproduced to scale in the depiction. In the one-dimensional case considered here, the tilting mirror 111 and the reflection plane 120 have parallel pivot axes. In the two-dimensional case that is relevant in practice, the axes are preferably, but not necessarily, each oriented in the x direction and in the y direction.

The angle of the reflection plane 120 is selected such that a sufficient proportion of the measuring beam 112.1 is reflected back or scattered at the reflection plane 120 in the direction of the measuring beam 112.1 emerging from the optics 114. The reflected measuring beam 112.1 thus passes back to the detector 103 via the optics 114 and the tilting mirror 111, along the measuring arm 110 via the beam splitter 102.

If the tilting mirror 111 is now inclined from the first position 111.1 into the second position 111.2, the reflected second measuring beam 112.2 emerges from the optics 114 in a manner laterally displaced with respect to the first measuring beam 112.1. The second measuring beam 112.2 extends in parallel between the optics 114 and the reflection plane 120. In practice, although deviations from parallelism occur, these can be remedied or at least quantified with the present calibration method. The second measuring beam 112.2 is also reflected back by the reflection plane 120 in the direction of the second measuring beam 112.2 emerging from the optics 114 and thus passes to the detector 103.

Figure 2:
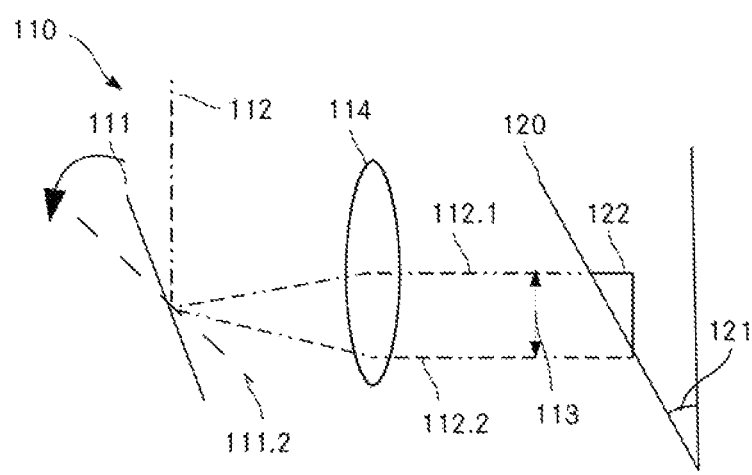
FIG. 2 shows a detail from FIG. 1, including the measuring position with the tilted plane.

FIG. 2 shows a detail from FIG. 1, including the measuring position with the tilted reflection plane 120. For the calibration method, the tilting angle 121 of the reflection plane 120 is assumed to be defined. It is now possible to extrapolate the lateral spacing 113 between the two measuring beams from the axial difference 122, of the two measured distances of the first measuring beam 112.1 and of the second measuring beam 112.2 and of the tilting angle 121. Thus, the measuring beam deflection can be calibrated by the tilting mirror 111.

The planes used for calibration can be present in various forms. Firstly, these planes can be installed in the interferometer and be introducible for example into the beam path. Secondly, the planes can be present in a separate appliance which can be inserted into the beam path as a calibration body or test specimen 300 if necessary.

Figure 3:
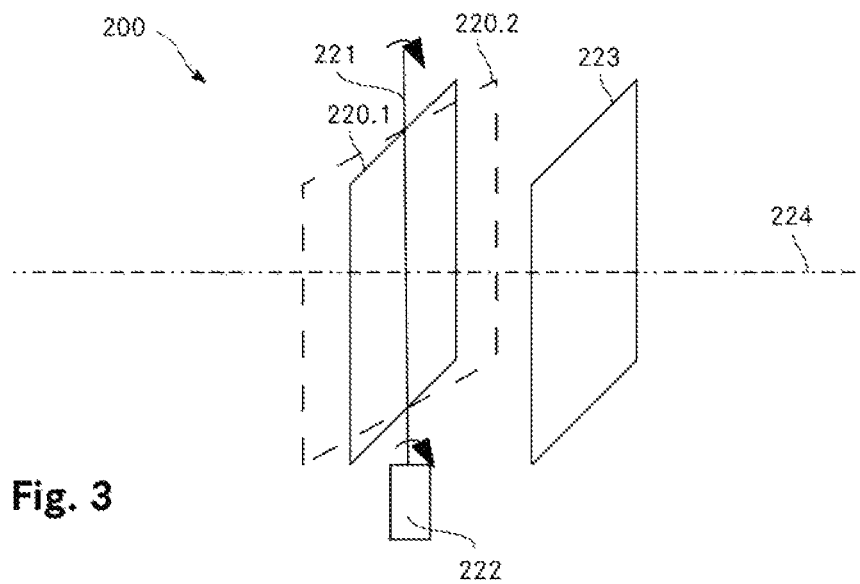
FIG. 3 shows a schematic illustration of a first embodiment of a test specimen.

FIG. 3 shows a schematic illustration of a first embodiment of a test specimen 200. The latter has in this case a first plane 220 with a tilting axis 221 about which the plane 220 is able to be tilted. A first position 220.1 of the plane is illustrated with a solid line and a second position 220.2 of the plane is illustrated with a dashed line, said position being achieved by tilting the plane 220. In the present test specimen, this first plane is tilted by means of a drive 222 comprising an electric motor. The test specimen furthermore comprises a fixedly arranged second plane 223 which in the present case has a normal parallel to the measuring beam axis 224. In the present case, the plane 220 is configured to be partially transmissive on both sides such that the measuring beam can also reach the second plane 223.

It is clear to a person skilled in the art that it is also possible to dispense with the second plane 223. In this case, the first plane 220 can also be configured in a non-transmissive manner such that the measuring beam 224 is able to be reflected substantially entirely by the plane 220. Furthermore, it is also possible to provide more than one tiltable plane, these being tiltable individually or together, by way of a drive. It is also possible to provide further fixedly arranged planes.

In the present case, the test specimen 200 does not have an explicit housing since it is intended for permanent assembly in an interferometer and so a housing is not absolutely necessary. Alternatively, however, the test specimen 200 can also be configured to be inserted into the beam path of the interferometer as required.

In a particularly preferred variant, a plurality of planes are fixedly arranged in the test specimen, whereby a cost-effective and precise test specimen is achieved.

Figure 4:
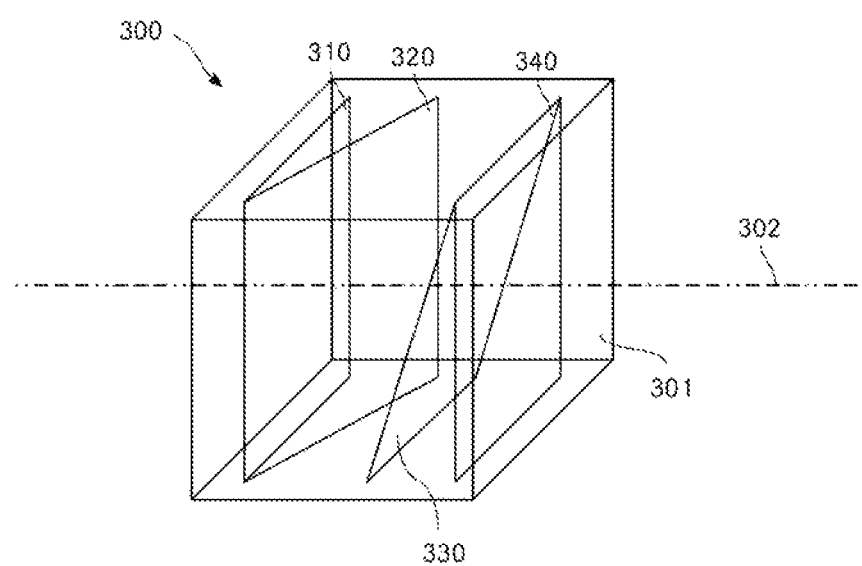
FIG. 4 shows a schematic illustration of a second embodiment of a test specimen.

FIG. 4 shows a schematic illustration of such a test specimen 300 in a second embodiment, which can be inserted as required in the measuring position of the interferometer 100. This test specimen 300 can also be configured to be inserted at a different point on the beam path of the interferometer 100.

The test specimen 300 comprises a substantially cuboidal housing 301 in which four planes 310, 320, 330, 340 are arranged such that all of the planes are reached by a measuring beam 302. The first plane 310 is arranged parallel to a first transmissive or open housing side. The fourth plane 340 is likewise arranged parallel to the first housing side. Arranged between the first and the fourth plane 340 are two tilted planes 320, 330. The second plane is tilted about a y-axis and the third plane 330 is tilted about an x-axis, while the measuring beam 302 passes through the test specimen 300 in a z direction. The tilting angle is 3 mrad in the present case, wherein the angle is not illustrated to scale.

In summary, according to the invention a method is created which allows precise and efficient calibration of an interferometer.

The invention claimed is:

1. An OCT-Scanner comprising an interferometer having a beam path and a test specimen for calibrating the interferometer, wherein the test specimen is arranged in the beam path and has at least one first plane for at least partially reflecting a measuring beam of the interferometer, wherein a normal to the first plane is inclined at a first angle to a beam path incident on the plane and wherein the test specimen comprises a second plane for reflecting the measuring beam, said second plane being inclined with respect to the first plane.

2. The OCT-Scanner according to claim 1, wherein the first plane is inclinable in a motor-driven manner.

3. The OCT-Scanner according to claim 1, having a beam path axis for a measuring beam of the interferometer, wherein the test specimen successively comprises the at least one first plane and the second plane, with which a measuring beam of the interferometer is at least partially reflectable, and wherein the first plane is partially transmissible to the measuring beam on both sides, and wherein a normal to at least one of the planes is inclined at a first angle to the beam path axis.

4. The OCT-Scanner according to claim 1, wherein the test specimen is installed fixedly in the interferometer, wherein the beam path can be guided onto the test specimen in order to carry out a calibration.

5. The OCT-Scanner according to claim 1, wherein the test specimen is movable or pivotable into the beam path and out of the beam path.

6. The OCT-Scanner according to claim 5, wherein the test specimen is movable into or out of the beam path or vice versa in a motor-driven manner.

7. The OCT-Scanner according to claim 1, wherein the test specimen also comprises a third and a fourth plane that partially reflect the measuring beam, wherein the second and the third plane are partially transmissible to the measuring beam on both sides and wherein the first, the second, the third and the fourth plane are located in succession on the beam path axis.

8. The OCT-Scanner according to claim 7, wherein a first normal to the first plane and a second normal to the second plane intersect, and a third normal to the third plane and a fourth normal to the fourth plane intersect.

9. The OCT-Scanner according to claim 7, wherein the first and the second plane are inclined about a first axis and the third and the fourth plane are inclined about a second axis, wherein the first and the second axis are different.

10. The OCT-Scanner according to claim 1, wherein the at least one first plane is configured as a glass plate or as a mirror in a partially transmissive manner for the measuring beam.

11. The OCT-Scanner according to claim 1, wherein the first angle is less than 50 mrad.

12. The OCT-Scanner according to claim 1, wherein the first angle is less than 20 mrad.

13. The OCT-Scanner according to claim 1, wherein the first angle is less than 5 mrad.

14. A device comprising an interferometer having a beam path and a test specimen for calibrating the interferometer, wherein the test specimen is arranged in the beam path and has at least one first plane for at least partially reflecting a measuring beam of the interferometer, wherein a normal to the first plane is inclined at a first angle to a beam path incident on the plane and wherein test specimen comprises a second plane for reflecting the measuring beam, said second plane being inclined with respect to the first plane.

* * * * *